United States Patent
Kaxiras et al.

(10) Patent No.: US 10,387,312 B2
(45) Date of Patent: Aug. 20, 2019

(54) SYSTEM AND METHOD FOR EVENT MONITORING IN CACHE COHERENCE PROTOCOLS WITHOUT EXPLICIT INVALIDATIONS

(71) Applicants: Stefanos Kaxiras, Uppsala (SE); Alberto Ros, Uppsala (SE)

(72) Inventors: Stefanos Kaxiras, Uppsala (SE); Alberto Ros, Uppsala (SE)

(73) Assignee: ETA SCALE AB, Uppsala (SE)

( * ) Notice: Subject to any disclaimer, the term of this patent is extended or adjusted under 35 U.S.C. 154(b) by 392 days.

(21) Appl. No.: 15/108,948

(22) PCT Filed: Jan. 2, 2015

(86) PCT No.: PCT/IB2015/050030
§ 371 (c)(1),
(2) Date: Jun. 29, 2016

(87) PCT Pub. No.: WO2015/101951
PCT Pub. Date: Jul. 9, 2015

(65) Prior Publication Data
US 2016/0321181 A1    Nov. 3, 2016

Related U.S. Application Data

(60) Provisional application No. 61/923,253, filed on Jan. 3, 2014.

(51) Int. Cl.
*G06F 12/00* (2006.01)
*G06F 12/0831* (2016.01)
(Continued)

(52) U.S. Cl.
CPC ........ *G06F 12/0831* (2013.01); *G06F 12/084* (2013.01); *G06F 12/0815* (2013.01);
(Continued)

(58) Field of Classification Search
None
See application file for complete search history.

(56) References Cited

U.S. PATENT DOCUMENTS

| | | | | |
|---|---|---|---|---|
| 6,233,640 B1 * | 5/2001 | Luke | ..................... | G06F 13/385 710/105 |
| 2003/0140264 A1 * | 7/2003 | Kawano | ................ | G06F 1/3203 713/500 |

(Continued)

OTHER PUBLICATIONS

Adve et al., "Weak Ordering—A New Definition," Proceedings of the 17th Annual International Symposium on Computer Architecture, ISCA '90, May 28-31, 1990, pp. 2-14, Seattle, WA, US.

(Continued)

*Primary Examiner* — David Yi
*Assistant Examiner* — Craig S Goldschmidt
(74) *Attorney, Agent, or Firm* — Patent Portfolio Builders PLLC

(57) ABSTRACT

Synchronization events associated with cache coherence are monitored without using invalidations. A callback-read is issued to a memory address associated with the synchronization event, which callback-read either reads the last value written in the memory address or blocks until a next write takes place in the memory address and reads a newly written value.

14 Claims, 9 Drawing Sheets

(51) Int. Cl.
| | |
|---|---|
| *G06F 12/0815* | (2016.01) |
| *G06F 12/084* | (2016.01) |
| *G06F 12/128* | (2016.01) |
| *G06F 13/16* | (2006.01) |
| *G06F 12/0811* | (2016.01) |
| *G06F 12/0817* | (2016.01) |

(52) U.S. Cl.
CPC ........ *G06F 12/128* (2013.01); *G06F 13/1663* (2013.01); *G06F 12/082* (2013.01); *G06F 12/0811* (2013.01); *G06F 2212/314* (2013.01); *G06F 2212/621* (2013.01)

(56) References Cited

U.S. PATENT DOCUMENTS

2004/0088494 A1* 5/2004 Glasco ................ G06F 12/0804
    711/141
2012/0198174 A1* 8/2012 Nellans ............... G06F 12/0804
    711/133

OTHER PUBLICATIONS

Ashby et al., "Software-Based Cache Coherence with Hardware-Assisted Selective Self-Invalidations Using Bloom Filters," IEEE Transactions on Computers, Apr. 2011, vol. 60, No. 4.

Choi et al., "DeNovo: Rethinking Hardware for Disciplined Parallelism," 2011 International Conference on Parallel Architectures and Compilation Techniques (PACT), Oct. 10-14, 2011, Galveston, TX, US.

Goodman et al., "Efficient Synchronization Primitives for Large-Scale Cache-Coherent Multiprocessors," Computer Architecture News, Apr. 1989, vol. 17, No. 2.

International Search Report and Written Opinion dated Apr. 9, 2015 in related International Application No. PCT/IB2015/050030.

Kaxiras et al., "A New Perspective for Efficient Virtual-Cache Coherence," Proceedings of the 40th Annual International Symposium on Computer Architecture, ISCA '13, Jun. 23-27, 2013, Tel-Aviv, IL.

Kaxiras et al., "SARC Coherence: Scaling Directory Cache Coherence in Performance and Power," IEEE Micro, Sep./Oct. 2010, pp. 54-65, vol. 30, No. 5.

Lebeck et al., "Dynamic Self-Invalidation: Reducing Coherence Overhead in Shared-Memory Multiprocessors," Proceedings of the 22nd Annual International Symposium on Computer Architecture, Jun. 22-24, 1995, Santa Margherita Ligure, IT.

Papadopoulos et al., "Monsoon: an Explicit Token-Store Architecture," ACM SIGARCH Computer Architecture News—Special Issue: Proceedings of the 17th Annual International Symposium on Computer Architecture, Jun. 1990, pp. 82-91, vol. 18, No. 2SI.

Ros et al., "Complexity-Effective Multicore Coherence," Proceedings of the 21st International Conference on Parallel Architectures and Compilation Techniques, PACT '12, Sep. 19-23, 2012, pp. 241-252, Minneapolis, MN, US.

Scott, "Shared-Memory Synchronization," Synthesis Lectures on Computer Architecture, Jun. 2013, Morgan & Claypool Publishers.

Sorin et al., "A Primer on Memory Consistency and Cache Coherence," Synthesis Lectures on Computer Architecture, Nov. 2011, vol. 6, No. 3, Morgan & Claypool Publishers.

Sung et al., "DeNovoND: Efficient Hardware Support for Disciplined Non-Determinism," Proceedings of the 18th International Conference on Architectural Support for Programming Languages and Operating Systems, ASPLOS '13, Mar. 16-20, 2013, pp. 13-26, Houston, TX, US.

\* cited by examiner

| CORE STEP | F/E 0 1 2 3 | CB 0 1 2 3 | |
|---|---|---|---|
| | . . . | . . . | INITIAL STATE WAS 1111,0000; ASSUME ALL CORES READ THE VALUE AND HAVE RESET ALL THE F/E BITS |
| 1 | 0 0 0 0 | 0 0 0 0 | CORE 0, 2 ISSUE CB |
| 2 | 0 0 0 0 | 1 0 1 0 | CORE 3: WRITES X |
| 3 | 0 1 0 1 | 0 0 0 0 | DATA TO CORE 0, 2 CORE 1, 3 F/E SET TO FULL |
| | | | CORE 1 ISSUES CB |
| 4 | 0 0 0 1 | 0 0 0 0 | DATA TO CORE 1 BECAUSE OF FULL F/E BIT (WHICH IS RESET) |
| 5 | 0 0 0 1 | 1 1 0 0 | CORES 0, 1 ISSUE CB EVICTION ANSWER CORE 0, 1 CBs WITH CURRENT VALUE |
| 6 | 1 1 1 1 | 0 0 0 0 | INITIAL STATE AFTER REPLACEMENT |
| | | | CORE 3 ISSUES CB |
| 7 | 1 1 1 0 | 0 0 0 0 | DATA TO CORE 3 BECAUSE OF FULL F/E BIT (WHICH IS RESET) |

FIG. 3

| STEP | A/O | F/E 0 1 2 3 | CB 0 1 2 3 | CORE ACTION 0 | 1 | 2 | 3 | COMMENTS |
|---|---|---|---|---|---|---|---|---|
| 1 | 1 | 1 1 1 1 | 0 0 0 0 | | | | | INITIAL STATE |
| 2 | 1 | 0 0 0 0 | 0 0 0 0 | | | L | | CORE 2 ATTEMPTS AND GETS LOCK (ALL F/E RESET) |
| 3 | 1 | 0 0 0 0 | 1 0 0 0 | L | | | | CORE 0 ATTEMPTS LOCK |
| 4 | 1 | 0 0 0 0 | 1 1 0 0 | | L | | | CORE 1 ATTEMPTS LOCK |
| 5 | 1 | 0 0 0 0 | 1 1 0 1 | | | | L | CORE 3 ATTEMPTS LOCK |
| 6 | 1 | 0 0 0 0 | 1 1 0 0 | | | U | | CORE 2 UNLOCKS AND WAKES CORE 3 (ROUND-ROBIN LEFT TO RIGHT) |
| 7 | 1 | 0 0 0 0 | 0 1 0 0 | | | | U | CORE 3 UNLOCKS AND WAKES CORE 0 |
| 8 | 1 | 0 0 0 0 | 0 0 0 0 | U | | | | CORE 0 UNLOCKS AND WAKES CORE 1 |
| 9 | 1 | 1 1 1 1 | 0 0 0 0 | | U | | | CORE 1 UNLOCKS AND LEAVES LOCK OPEN (NO CB => ALL F/E SET) |
| 10 | 1 | 0 0 0 0 | 0 0 0 0 | L | | | | CORE 2 ATTEMPTS AND GETS LOCK (ALL F/E RESET) |

FIG. 5

| STEP | A/O | F/E 0 1 2 3 | CB 0 1 2 3 | CORE ACTION 0 | 1 | 2 | 3 | COMMENTS |
|---|---|---|---|---|---|---|---|---|
| 1 | 1 | 1 1 1 1 | 0 0 0 0 | | | R | | INITIAL STATE |
| 2 | 1 | 0 0 0 0 | 0 0 0 0 | | | M | | CORE 2 READS (AND RESETS ALL F/E) |
| 3 | 1 | 0 0 0 0 | 1 1 0 1 | | | $W_1$ | | CORE 0,1,3 ISSUE RMW BUT HAVE TO WAIT (F/E BITS EMPTY) BY SETTING CBS |
| 4 | 1 | 0 0 0 0 | 1 1 0 0 | | | | R X | CORE 2 ACQUIRES LOCK AND WAKES CORE 3 (ROUND-ROBIN LEFT TO RIGHT) |
| 5 | 1 | 0 0 0 0 | 1 1 0 1 | | | $W_1$ | | CORE 3 TESTS BUT FAILS (LOCK IS TAKEN), ISSUES NEW RMW AND SETS AGAIN THE SAME CB |
| 6 | 1 | 0 0 0 0 | 1 0 1 0 | R M $W_1$ | | | | CORE 2 RELEASES LOCK, WAKES CORE 0 WITH NEW VALUE |
| 7 | 1 | 0 0 0 0 | 0 0 0 1 | R X | | | | CORE 0 TESTS AND ACQUIRES LOCK WAKES CORE 1 |
| 8 | 1 | 0 0 0 0 | 0 1 0 1 | | | | | CORE 1 TESTS BUT FAILS (LOCK IS TAKEN), ISSUES NEW RMW AND SETS AGAIN THE SAME CB |

FIG. 6

| STEP | A/O | F/E 0 1 2 3 | CB 0 1 2 3 | CORE ACTION 0 \| 1 \| 2 \| 3 | COMMENTS |
|---|---|---|---|---|---|
| 1 | 1 | 1 1 1 1 | 0 0 0 0 | R (core 2) | INITIAL STATE |
| 2 | 1 | 0 0 0 0 | 0 0 0 0 | M (core 2) | CORE 2 READS (AND RESETS ALL F/E) |
| 3 | 1 | 0 0 0 0 | 1 1 0 1 | W (core 2) | CORE 0,1,3 READ BUT HAVE TO WAIT (F/E EMPTY) |
| 4 | 1 | 0 0 0 0 | 1 1 0 1 | $W_1$ (core 2) | CORE 2 ACQUIRES THE LOCK BUT DOES NOT WAKE UP ANY OTHER CORE (WRITE$_{CB0}$) |
| 5 | 1 | 0 0 0 0 | 1 1 0 0 | $W_0$ (core 2); R, M (core 3) | CORE 2 RELEASES LOCK, WAKES CORE 3 WITH NEW VALUE (WRITE$_{CB1}$) |
| 6 | 1 | 0 0 0 0 | 1 1 0 0 | $W_1$ (core 3) | CORE 3 TESTS AND ACQUIRES LOCK BUT DOES NOT WAKE UP ANY OTHER CORE (WRITE$_{CB0}$) |
| 7 | 1 | 0 0 0 0 | 0 1 0 0 | R, M, $W_0$ (core 0) | CORE 3 RELEASES LOCK, WAKES CORE 0 WITH NEW VALUE (WRITE$_{CB1}$) |
|  |  |  |  |  | CORE 0 TESTS AND ACQUIRES LOCK BUT DOES NOT WAKE UP ANY OTHER CORE (WRITE$_{CB0}$) |

FIG. 7

SYSTEM AND METHOD FOR EVENT MONITORING IN CACHE COHERENCE PROTOCOLS WITHOUT EXPLICIT INVALIDATIONS

RELATED APPLICATION

The present application is related to, and claims priority from U.S. Provisional Patent Application No. 61/923,253, filed Jan. 3, 2014, entitled "SYSTEM AND METHOD TO IMPLEMENT SPIN-WAITING IN CACHE COHERENCE WITHOUT INVALIDATIONS", to Stefanos Kaxiras and Alberto Ros, the disclosure of which is incorporated herein by reference.

TECHNICAL FIELD

Embodiments described herein relate in general to synchronization or coherence in multiprocessor systems and, more particularly, to event monitoring in a multiprocessor system that does not use explicit invalidations.

BACKGROUND

In many multiprocessor systems, memory devices are organized in hierarchies including main memory and one or more levels of cache memory. Data can reside in one or more of the cache levels and/or main memory. Cache coherence protocols are used in multiprocessor systems to address the potential situation where not all of the processors see the same data value for a given memory location.

Memory systems are said to be coherent if they see memory accesses to a single data location in order. This means that if a write access is performed to data location X, and then a read access is performed to the same data location X, the memory hierarchy should return X regardless of which processor performs the read and write and how many copies of X are present in the memory hierarchy. Likewise, coherency also typically requires that writes be performed in a serialized manner such that each processor sees those write accesses in the same order.

There are various types of cache coherency protocols and mechanisms. For example, "explicit invalidation" refers to one mechanism used by cache coherence protocols wherein when a processor writes to a particular data location in a cache then all of the other caches which contain a copy of that data are flagged as invalid by sending explicit invalidation messages. An alternative mechanism is updating wherein when a processor writes to a particular data location in a cache, then all of the other caches which contain a copy of that data are updated with the new value. Both of these cache coherence mechanisms thus require a significant amount of signaling, which scales with the number of cores (or threads) which are operating in a given data processing system. Accordingly, these various cache protocols and mechanisms are known to have their own strengths and weaknesses, and research continues into improving cache coherency protocols with an eye toward maintaining (or improving) performance while reducing costs (e.g., energy consumption) associated with coherency traffic.

For example, recently a number of proposals have been set forth which aim to simplify coherence by relying on data-race-free semantics and on self invalidation to eliminate explicit invalidation traffic and the need to track readers at the directory. The motivation for simplifying coherence has been established in numerous articles, some of which are mentioned herein. For example, with the addition of self-downgrade, the directory can be eliminated, see, e.g., A. Ros and S. Kaxiras, "Complexity-effective multicore coherence," in 21st International Conference on Parallel Architectures and Compilation Techniques (PACT), 2012, and virtual cache coherence becomes feasible at low cost, without reverse translation, see, e.g., S. Kaxiras and A. Ros, "A new perspective for efficient virtual-cache coherence," in 40th International Symposium on Computer Architecture (ISCA), 2013. Significant savings in area and energy consumption without sacrificing performance, have also been demonstrated. Additional benefits regarding ease-of-verification, scalability, time-to-market, etc., are possible as a result of simplifying rather than complicating such fundamental architectural constructs as coherence.

In self-invalidation cache coherence protocols, writes on data are not explicitly signaled to sharers as is the case with explicit invalidation cache coherence protocols. Instead, a processor automatically invalidates its locally stored cache copy of the data. However, data races throw such self-invalidation protocols into disarray, producing non-sequential-consistent executions, see, e.g., A. R. Lebeck and D. A. Wood, "Dynamic self-invalidation: Reducing coherence overhead in shared-memory multiprocessors," in 22nd International Symposium on Computer Architecture (ISCA), 1995. All such proposals seen thus far offer sequential consistency for data-race-free (DRF) programs, see, e.g., S. V. Adve and M. D. Hill, "Weak ordering—a new definition," in 17th International Symposium on Computer Architecture, 1990.

Data-race-free semantics require that conflicting accesses (e.g., a read and a write to the same address from different cores or processors) must be separated by synchronization (perhaps transitive over a set of threads). Self-invalidation is therefore initiated on synchronization.

There are situations where explicit invalidation may be preferred over self-invalidation. For instance, spin-waiting, also known as busy-waiting, which involves checking to see if a lock is available, can be performed more efficiently with explicit invalidations and local spinning on a cached copy, rather than repeatedly self-invalidating and re-fetching. While self-invalidation works well for race-free data, it shows an inherent weakness when it comes to spin-waiting. Entering a critical section, or just spin-waiting for change of state, requires repeated self-invalidation of the lock or flag variable. Herein lies the problem: spin loops cannot spin on a local copy of the synchronization variable which would be explicitly invalidated and re-fetched only with the writing of a new value in write-invalidate protocols. Repeated self-invalidation in local caches leads to excessive traffic to the shared last-level cache (LLC) in the system, wasting bandwidth and/or energy. In the text below, the shared LLC is also sometimes referred to as a "global cache" or a "shared cache".

The solutions that have been proposed to this problem with self-invalidation protocols thus far are costly. For locks, they involve some form of hardware queuing either with a blocking bit in the LLC cache lines and request queuing in the LLC controller when this bit is set, or with a full-blown hardware implementation of queue locking, see, e.g., J. R. Goodman, M. K. Vernon, and P. J. Woest, "Efficient synchronization primitives for large-scale cache-coherent multiprocessors" ACM, 1989, vol. 17, no. 2, and H. Sung, R. Komuravelli, and S. V. Adve, "DeNovoND: Efficient hardware support for disciplined non-determinism," in 18th International Conference on Architectural Support for Programming Language and Operating Systems (ASPLOS), 2013. The cost and complexity of these proposals is not trivial. Further, they tie the lock algorithm to the specifics of the hardware implementation (so the lock algorithm inherits, for better or worse, whatever fairness, starvation, live-lock properties, etc. are offered by the hardware mechanism).

One option is to consider reverting back to explicit invalidation for a small set of addresses, namely spin variables. However, explicit invalidations are unsolicited and unanticipated, giving rise to a number of drawbacks that make them unappealing. Because they are unanticipated, explicit invalidations cause significant protocol state explosion to resolve protocol races. Because they are unsolicited, explicit invalidations break the mold of a simple request-response protocol, meaning that they cannot be used for virtual caches without reverse translation.

Accordingly, it would be desirable to provide systems and methods that avoid the afore-described problems and drawbacks associated with the handling of spin waiting and other event monitoring situations without using explicit invalidations as part of the event monitoring mechanism.

SUMMARY

The embodiments described herein, among other things, address the weaknesses of self invalidation described above, but at the same time refrain from compromising some of its important properties such as simplicity and compatibility with virtual cache coherence. For example such embodiments can be used in protocols that simplify coherence by eliminating explicit invalidation from event monitoring during synchronization.

According to some embodiments, a callback mechanism is described which avoids repeated self-invalidation and re-fetch of data. Callbacks follow a request-response paradigm, are efficiently implemented in a small structure, and eliminate wasteful re-fetches of data while at the same time allowing the cores to pause (e.g., to save energy) rather than actively spin on a cached copy waiting for a change of state.

As described above, there is an inherent difficulty in self-invalidation protocols' ability to handle spin-waiting, and other event monitoring cache coherence activities. Explicit invalidations work better than self-invalidation for spin-waiting but carry significant complexity. The embodiments disclosed herein address, among other things, self-invalidation's biggest weakness: intentional data races for synchronization.

According to an embodiment, a computer system includes multiple processor cores, at least one local cache memory associated with and operatively coupled to each core for storing one or more cache lines accessible only by the associated core, a shared memory, the shared memory being operatively coupled to the local cache memories and accessible by the cores, the shared memory being capable of storing a plurality of cache lines, and wherein a core issuing a callback-read to a memory address either reads the last value written in this address or blocks until the next write takes place in the memory address and then reads a new value such that the callback-read enables event monitoring for coherence of the at least one local cache and the shared memory without using explicit invalidations.

According to another embodiment, a method includes the steps of monitoring synchronization events associated with cache coherence without using invalidations by issuing a callback-read to a memory address, which callback-read either reads the last value written in the memory address or blocks until a next write takes place in the memory address and reads a newly written value.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 3 shows how callback reads to an address are handled as a series of steps and corresponding bit states in a callback directory including both full/empty bits and callback bits according to an embodiment;

FIG. 5 illustrates operation of a callback directory entry involving a callback write one instruction according to an embodiment;

FIG. 6 illustrates operation of a callback directory entry involving a callback write one instruction interacting with a locking mechanism according to an embodiment;

FIG. 7 illustrates operation of a callback directory entry involving a callback write zero instruction interacting with the locking mechanism of FIG. 6 according to an embodiment;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of multiprocessor or multicore cache coherence protocols. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Embodiments provide for a callback mechanism (referred to herein sometimes as a callback) that can be applied to ordinary load instructions that are involved in non-data-race-free accesses or via specialized instructions disclosed herein. The callback mechanism generates, for example and according to one embodiment, a callback read which blocks waiting for a write if no intervening write happened since its last invocation. Callback according to the embodiments provides the benefit of explicit invalidation, for only these few accesses that need it, but without the cost of implementing a full-blown invalidation protocol (incurring all its complexity and cost) at the same time with a self-invalidation solution which would otherwise defeat the purpose of simplifying cache coherence with self-invalidation. Other embodiments also describe various types of callback writes.

Figure 1:
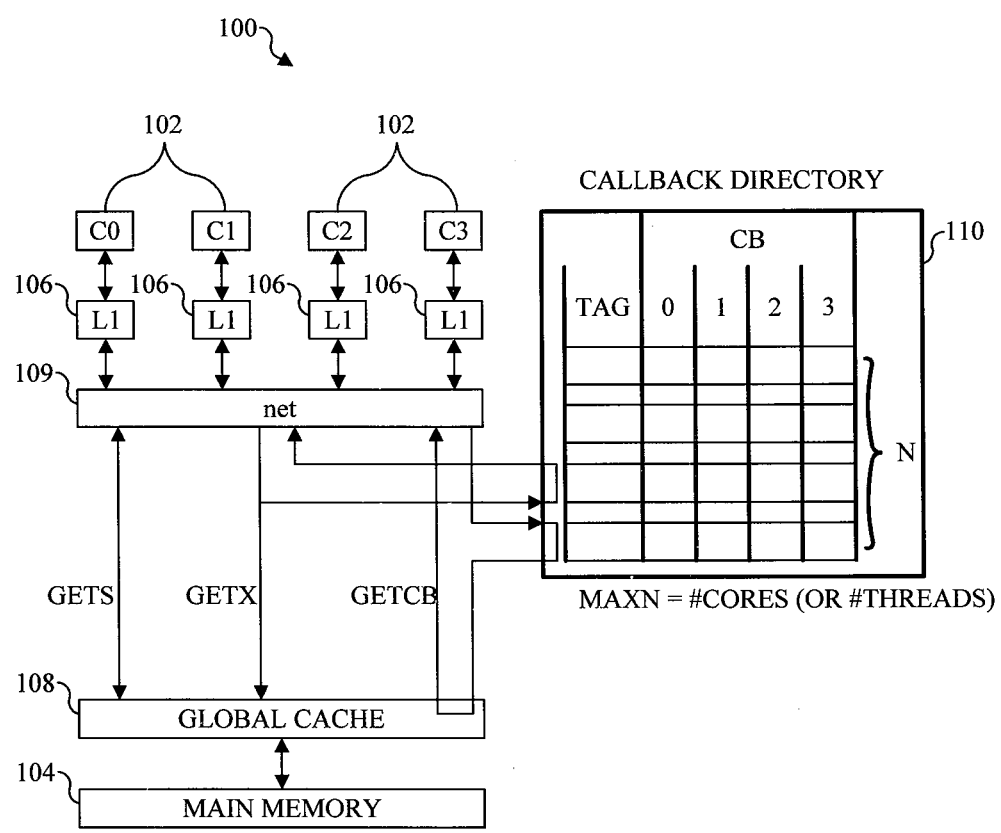
FIG. 1 depicts an exemplary multiprocessor architecture including a callback directory according to an embodiment.

To provide some context for understanding an environment in which the embodiments can operate, consider a computer system 100 as shown in FIG. 1. Therein the system 100 includes multiple processor cores 102, main memory 104, at least one local cache memory 106 associated with and operatively coupled to each core 102 for storing one or more cache lines of data which are accessible only by the associated core 102, and a global cache memory 108. The global cache memory 108 is operatively coupled to the local cache memories 106 and main memory 104 and accessible by the cores 102 via a network interconnect 109, the global cache memory 108 being capable of storing a plurality of cache lines of data. Those skilled in the art will appreciate that the computer architecture illustrated in FIG. 1 is purely exemplary and that the embodiments can be implemented in different architectures than the one illustrated therein. For example, the cache hierarchy can include additional levels, e.g., level 2 cache, level 3 cache, etc.

The system 100 also includes a callback directory 110 according to an embodiment. The callback mechanism implemented using the callback directory 110 is initiated by a reader core 102 (or thread) that wishes to read the next value that is to be written on a particular address. The reader core 102 (or thread) places a callback marker (henceforth referred to simply as "callback") on the address it reads. The callback marker is, according to this embodiment, a callback (CB) bit stored in the callback directory 110 which is associated with the address (tag) and the reader core 102 (or thread). Other embodiments provide for other mechanisms to enable this callback functionality. When a write occurs on an address whose CB bit is set, the written value is sent to the waiting reader core 102 (or thread). If the write occurred prior to the reader core 102 (or thread) setting the callback marker (but after the reader core 102 issues the callback instruction), then the current value stored in this address is returned to the reader core 102 (or thread). In the embodiment of FIG. 1, the CB bits serve the dual purpose of indicating whether a particular core 102 has issued a callback instruction for a particular address and also whether a write has occurred to that address since the last time that a core has issued a callback instruction for that address. Although not shown in the embodiment of FIG. 1 (see instead FIG. 3), the callback mechanism can instead include a full/empty bit (F/E) per core or thread associated with each address, to separate the dual functionality of the CB bits in the embodiment of FIGS. 1 and 2 to better manage the writes that occur on this address prior to the setting of a callback. According to various embodiments described below, a callback can be initiated transparently on selected memory accesses (e.g., load instructions) or explicitly initiated by a specific callback instruction.

In the embodiment of FIG. 1, callback reads are implemented via a callback bit (CB) per core that is associated with an address (tag). A set of CB bits, may be associated with each desired memory address, each bit in the set corresponding to a core (and/or a thread). Conceptually, every address could have its own set of callback bits, but of course this is impractical in a callback directory table 110 having a limited size. In practice, a relatively small directory 110 maintains a set of these bits per cache line, typically just for a few cache lines. Because callback bits are typically needed for very few addresses (e.g., for synchronization variables, locks and flags) the callback directory 110 does not need to cover the entirety of the address space or even the entirety of the cached data. According to an embodiment, it is the callbacks themselves that allocate entries in the callback directory 110. As shown in FIG. 1, the callback directory 110 has tags to check for a hit or a miss. All callbacks and all writes regarding callbacks (see below for the full list) go to the callback directory 110. If the callbacks or writes regarding callbacks miss in the callback directory 110, then the callback directory 110 allocates a new entry for the missed tag and may evict another entry if there is no free space in the callback directory 110. Any desired replacement algorithm can be used to effect eviction as will be apparent to those skilled in the art. Additionally, it can be seen that, in this embodiment a callback is for a particular address, e.g., representing a word in this embodiment, however it will be appreciated by those skilled in the art that the callback could be associated with a different granularity of data, e.g., a byte or a block.

The callback directory 110 is, in this embodiment, managed as a cache (e.g., with evictions and a replacement policy) but is not backed by main memory 104. A logical upper limit for the number of entries in this directory 110 would be equal to the number of cores (since there can be only so many callbacks set on different variables as the number of cores) or, alternatively, the number of entries can be equal to the number of threads for multithreaded cores. In other implementations the number of entries in the callback directory 110 may be set using other criteria.

In cache coherence protocols which have a delayed write through, a write performed by a core 102 may be stuck in a write buffer for some time. In this case it is not visible to the rest of the computer system, at least not until it is flushed (presumably because of synchronization) to the last level cache at which point it is made globally visible. Thus, according to an embodiment, the callback directory 110 can be located logically at the level where writes become globally visible to all cores 102, e.g., the shared last level cache for some coherence protocols. Further, a write typically needs to access the callback directory at the time it becomes globally visible rather than before that (i.e., when it is hidden in a write buffer near the core).

As mentioned earlier, the granularity of the callback tracking can be for any desired data block, e.g., per cache line. However, since embodiments typically only need to track the CB bits for a limited set of addresses, such embodiments can afford to do this at a word granularity, thus allowing independent callback reads for individual words in a cache line. This works well with the individual-word updating of the global cachelines in a self-downgrade protocol according to some embodiments.

In contrast to invalidation directories, a callback directory 110 is not in the critical path of reads (GetS) or writes (GetX). In the latter case, the callback directory 110 is accessed in parallel with the global cache 108. As shown in FIG. 1 only callback reads (GetCB) need to consult the callback directory 110 before accessing the global cache 108. With the exemplary system 100 in mind, an operational example which illustrates how the callback mechanism operates according to an embodiment will now be provided with respect to FIG. 2.

Figure 2:
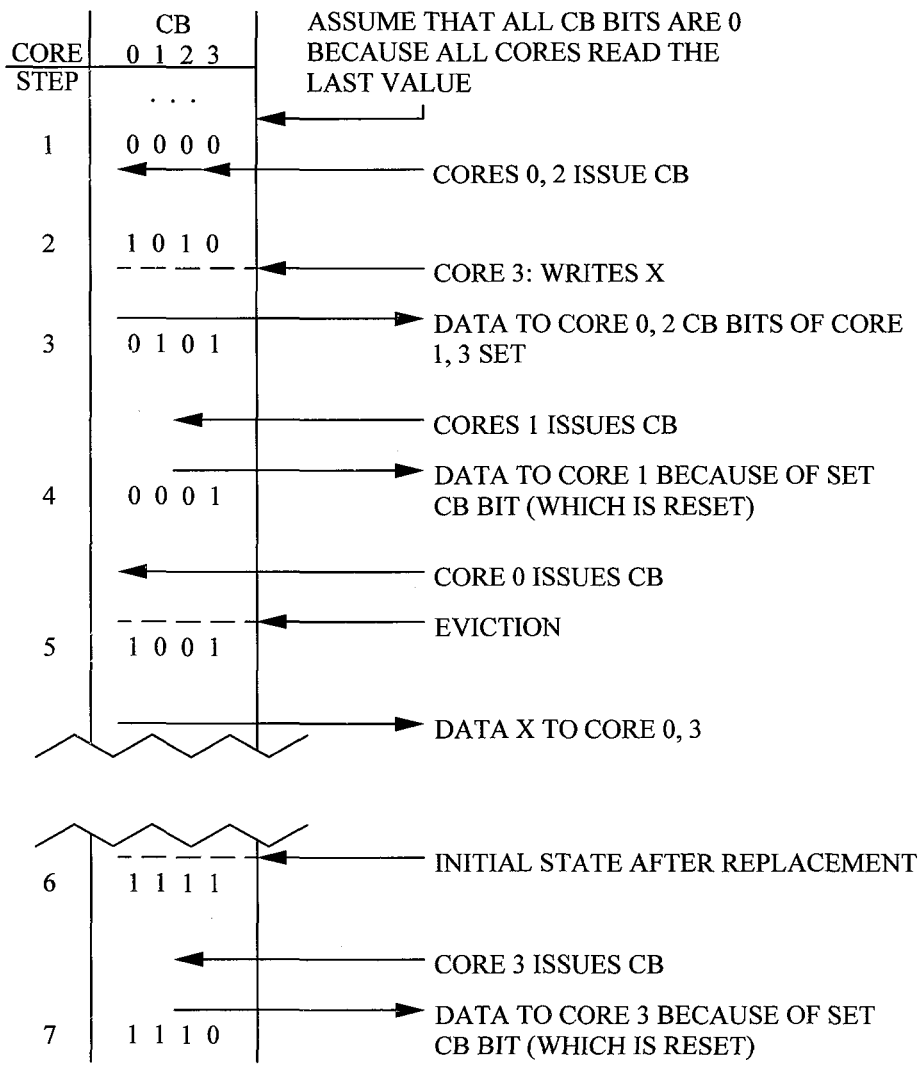
FIG. 2 shows how callback reads to an address are handled as a series of steps and corresponding bit states in a callback directory according to an embodiment.

The example in FIG. 2 involves a single address being accessed by four cores 102 (core0 . . . core3). Thus, each row in FIG. 2 represents a single row or entry in the callback directory 110 at different times (steps). As shown, there are four CB bits, one per core 120, corresponding to this address which are stored in the callback directory 110 and associated with the tag for this address. In this example, a CB bit value of 0 indicates that no callback is requested by the corresponding core (or thread) and a CB bit value of 1 indicates that a callback is requested by the corresponding core (or thread), although those skilled in the art will appreciate that those bit value roles could be reversed. Prior to the callback steps illustrated in FIG. 2, the initial state of the CB bits is 1 (which is also the default state after the CB bits are lost, e.g., due to a replacement in the callback directory 110). Assume next that all CB bits are 0 (step 1) because all of the cores 102 have previously read the last value of this data and have reset their CB bit. Assume next that cores 0 and 2 issue callback reads to this address, setting the corresponding CB bits (step 2), thereby indicating that they would like to receive the value from this address when it is written to again. The callbacks block since there is currently no new value to consume, as indicated by the CB value of zero when the callback reads arrive at the callback directory 110.

Later, when a write is performed on the address from core 3, the callbacks are activated and two wakeup messages carry the newly created value to cores 0 and 2. Then, the corresponding CB bits for core 0 and core 2 are set to false (i.e., 0) and the unset CB bits of the cores that did not have a callback are set to 1 (step 3), i.e., the CB bits for cores 1 and 3 in this example. This functionality ensures that cores that had a callback have now consumed the new value of the recent write to the address, but cores that did not set a callback can henceforth directly access the written value because their corresponding CB bits are set. This latter functionality can alternatively be provided by a separate set of full/empty bits which are discussed below with respect to the embodiment of FIG. 3. Thus when a core issues a callback request and finds its CB bit set in callback directory 110 for that address, it consumes the value and resets its CB bit. This is shown in step 4 after core 1 issues a callback request to this particular address.

A replacement in the callback directory 110, e.g., which may occur for example when another address is selected to be added to the callback directory 110, causes CB bits to be lost for the address being replaced. Since the callback directory 110 is not backed in main memory 104, the data associated with the address being evicted is sent to all cores 102 for which callbacks are set on that address in response to the eviction instruction (step 5). The cores 102 that have a callback set in the callback directory are notified that their callback is answered but get the last value written (and not the newer value they are waiting for). These are the semantics of a simple read that is unordered with respect to writes. Re-installing an address in the callback directory 110 sets all its CB bits to 1, meaning that any subsequent callback request immediately gets the last written value without waiting (steps 6 and 7).

For the embodiment of FIGS. 1 and 2, consecutive writes to an address, without any intervening callback reads, set all the CB bits (for all cores 102) of this address and subsequently broadcast to all cores 102 the written values. To avoid this behavior more bits can be used in conjunction with the CB bits to differentiate when a core is waiting for a new write and when a new value is available for the next callback to consume as will now be described below with respect to the embodiment of FIG. 3.

In another embodiment callback reads are implemented via a full/empty (F/E) bit and a callback bit per core 102 that are associated with an address. Thus the callback directory 110 shown in FIG. 1 would be expanded to include another set of F/E bits for each row. This embodiment also limits the written values that are sent during a write to only the cores 102 that are waiting for these values, without the need of a callback request queue (described below with respect to FIG. 4). The following example, shown in FIG. 3, illustrates this approach.

As in the example of FIG. 2, the example of FIG. 3 concerns a single global shared address, such that each row in FIG. 3 corresponds to a single row or entry in the callback directory 110 at different times (steps). As shown, in this embodiment, there are four F/E bits and four CB bits, one per core 102, corresponding to this particular address. In this example, a CB bit value of 0 indicates that no callback is requested by the corresponding core (or thread) and a CB bit value of 1 indicates that a callback is requested by the corresponding core (or thread), and an F/E bit value of 1 indicates full, while 0 indicates empty, although those skilled in the art will appreciate that those bit value roles could be reversed. The starting state prior to step 1 occurring in the embodiment of FIG. 3 is that all F/E bits are set to 1 (full), and all callback bits are set to 0 (no callback). This is also the default state after F/E bits and the CB bits are lost (e.g., due to a replacement). Assume, for this example, that all cores 102 have read the address of interest in this example with a callback read and that no further writes have occurred since then. The state for this callback directory entry is then all F/E bits set to 0 and all CB bits set to 0 (step 1).

Assume now that cores 0 and 2 issue callback reads to this address, setting the corresponding CB bits (step 2). The callback reads block and wait since there is no value to consume. When later a write is performed on the address from core 1, the callbacks are answered and two wakeup messages carry the newly created value to cores 0 and 2. Then, the corresponding callbacks are set to false (0) and the unset F/E bits of the cores that did not have a callback are set to full (step 3). Cores 102 that had a callback have now consumed the write, but cores that did not set a callback can henceforth directly access the written value because their corresponding F/E bits are set to full. When a core 102 issues a callback and finds its F/E bit set (full)in the callback directory 110, it consumes the value and leaves both its F/E bit and callback bit unset (empty and no callback). This is shown in step 4 in FIG. 3. It will be appreciated by those skilled in the art from this example that a callback can consume a single write, whether it happens before or after the callback. If the write happened before the callback, then the callback immediately returns, otherwise it will get called back from the write itself. It will also be apparent that this embodiment generates a bulk behavior for all the cores 102 that are waiting on a callback.

As with previous embodiments, an eviction or replacement in the callback directory 110 causes the F/E and CB bits for the evicted address to be lost in this embodiment as well. Since the callback directory 110 is not backed in main memory 104, discarding the information regarding which cores 102 are waiting for a write is not optimal. In this embodiment all the callbacks that have been set on the evicted address are satisfied before eviction. The current value is sent to all the cores 102 that have a set CB bit on the address (as shown in FIG. 3, step 5). The cores 102 that are waiting for a callback are notified that their callback is answered but they receive the last value that was made globally visible for this address and not a future value.

When a cache line is fetched from memory it is assumed that all its F/E bits are set to full, and since there cannot be any outstanding callbacks all the CB bits are set to 0. This is the default starting state of an initialized variable (FIG. 3, step 6). Once a core issues a callback request toward an address having this default starting state, it will immediately consume the value and reset its F/E bit value (step 7).

Alternatively, and according to another embodiment, a callback request queue can be used in conjunction with F/E bits in the callback directory as another mechanism to limit the sending of newly written values to only the cores 102 that have an outstanding request relative to embodiments that only use CB bits (e.g., FIG. 1), as will now be discussed with respect to FIG. 4. In this embodiment the CB bits previously provided in the callback directory 110 are replaced with a unique callback-queue per callback directory. Each queue 400 stores the pending callback requests issued for a given core for a given address. When a queue 400 becomes full, callbacks in that queue can be dequeued and answered, although with the old data.

Figure 4:
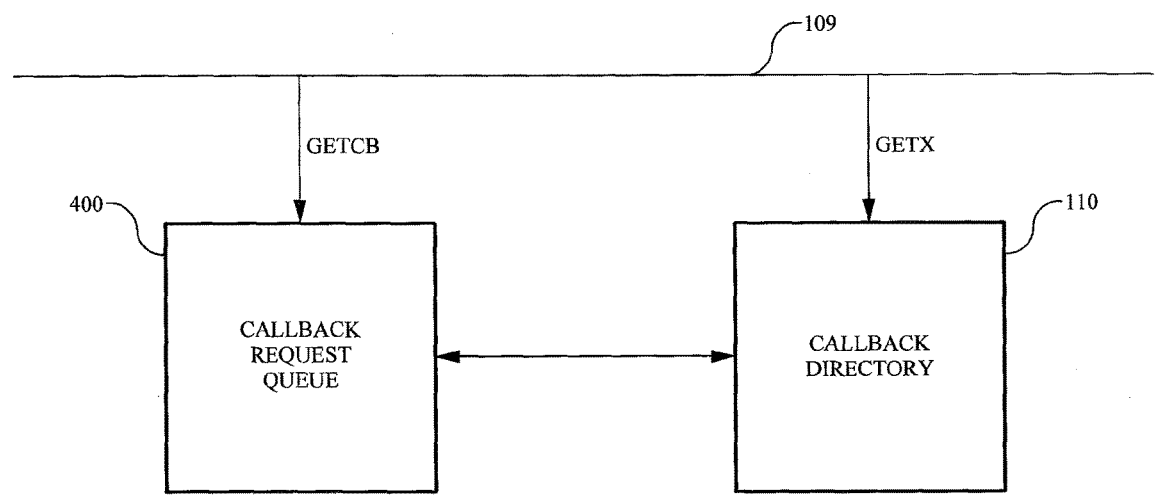
FIG. 4 illustrates the usage of a callback request queue in conjunction with a callback directory according to an embodiment.

Thus, in the embodiment of FIG. 4, a callback request queue 400 is used in conjunction with the callback directory 110 which contains the F/E bits, but no CB bits. The request queue 400 contains all the requests from cores 102 that are blocked and waiting for a new write to a given address. When a write occurs, the newly written value is only sent to the cores 102 that have a request in the request queue 400. The corresponding requests are then removed from the callback request queue 400. This embodiment, like the embodiment of FIG. 3, limits the sending of written values to only the cores 102 that are waiting for such a value.

Like the previous embodiment without the callback request queue 400, an eviction or replacement in the callback directory 110 causes the CB bits for the evicted address to be lost. Since the callback directory 110 is not backed in main memory 104, discarding the information regarding which cores 102 are waiting for a write is not optimal. In this embodiment all of the callback requests that are waiting in the queue 400 corresponding to the evicted address are satisfied before eviction. The cores 102 that are waiting for a callback are notified that their callback is answered but they receive the last value that was made globally visible for this address and not a future value.

In another embodiment only one callback out of many is serviced on a write. Previous embodiments optimize the case of a data race involving multiple reads conflicting with a write. When a new value is produced by a write all (waiting) reads are woken up. Likewise, reads from many different cores may consume the same value that was previously written. This fits well with synchronization idioms having a broadcast or multicast behavior (e.g., barriers). However, if one considers lock synchronization, a callback mechanism that wakes up all waiting reads may be inefficient. In lock synchronization only one out of a set of competing lock acquires succeeds. Thus, releasing a lock, which is a write on the lock variable, should wake up one waiting acquire instead of all. Likewise, a free lock could be read by the first lock acquire that arrives, rather than all.

In this embodiment being referred to herein as "callback one", to optimize the case of locks, a variant of the write being referred to herein as a "writeCB1" that wakes up a single waiting callback can be used in addition to the previously described callbacks. When using this new coherence instruction the number of callbacks that are satisfied is specified by the write—not the reads that set the callbacks.

To distinguish a callback one from the previous callback embodiments described above and illustrated in FIGS. 1-4, the previous callback embodiments shall now be referred to as "callback all" embodiments.

Using a writeCB1 wakes up a single callback, if there are any callbacks set. But it also has another equally important effect: it forces all F/E bits to act in unison, i.e., behave as a single F/E bit. The change in the functionality of the F/E bits for embodiments which provide for both callback ones and callback all is encoded in an "All/One" (A/O) bit in the callback directory entries. This bit is set to "All" by default and, when the A/O bit is set to "All", then the F/E bits of a callback directory entry act individually as described in the previous callback-all embodiments of FIGS. 1-4. However, when a writeCB1 is issued by one of the cores 102, this sets the A/O bit to "One" causing the F/E bits of the callback directory entry to behave in unison (as a single bit) and making the entry have a "callback-one" status. Any normal write or read to an address having a tag in the callback directory 110 for this embodiment resets the A/O bit to "All."

FIG. 5 provides a high-level example of a callback one and callback all embodiment. Assume that the A/O bit of the callback entry is already set to "One" and the entry has the F/E bits set to "full" (step 1), i.e., a callback one instruction has previously been issued by one of the cores 102 for the address of interest in FIG. 5. In step 2, core 2 gets the lock and since it reads the lock value all the F/E bits are set to "empty". Thus, no other core 102 can now read the value of the lock (since it is "empty") and have to set their corresponding CB bit and wait when they attempt the lock as shown in steps 3, 4 and 5.

When core 2 releases the lock with a writeCB1 it wakes up just one of the waiting cores (step 6). Which core is awakened is a matter of policy, and any desired policy may be selected to identify which core to awaken depending upon the particular implementation desired, e.g., random, pseudo-random, FIFO, round-robin, etc. One embodiment uses a pseudo-random policy to determine which core awakens in response to a writeCB1, starting from any set CB bit and proceeding round-robin towards cores with higher IDs (wrapping around at the highest ID). In FIG. 5, using this pseudo-random round-robin policy the order that the cores get the lock is 2, 3, 0, 1, which is different than the arrival of acquires at the callback directory (i.e., 2, 0, 1, 3). Steps 6-9 thus show a one at a time unlocking of the cores 102 based on this exemplary awakening policy, but other orders could have been generated using other policies.

In contrast to callback-all, when a writeCB1 satisfies a callback, i.e., when all of the cores have been awakened, the F/E bits are left undisturbed, set to "empty" unless, as is the case in the example of FIG. 5, there is no callback left to satisfy in which case all the F/E bits and the A/O bit are set to "full" (step 9). (In a callback-all embodiment the F/E bits of the cores that did not have callbacks are set to "full".) In all cases, no individual F/E bit is set or reset but rather all of them are set or reset as if they were a single bit. This is the abstraction of a callback-one embodiment: a value can only match one read that either precedes or succeeds the write creating this value.

Similarly to callback-all, a callback-one directory entry can be evicted by satisfying all its callbacks with the current value. The starting state, when it is brought back in the callback directory, is all F/E bits set to "full" and all CB bits cleared. The All/One bit is reset to "All."

In another embodiment a write callback zero (also called herein a "writeCB0") satisfies no callbacks that are set. Lock acquires are typically implemented using atomic primitives such as T&S, Fetch&func, CAS, or others. In general, a lock acquire is an algorithm based on an atomic read-modify-write (RMW) operation. For example, in the case of a lock implemented with Test&Set (T&S) the write sets the lock to "taken" when the test succeeds (i.e., when it finds the lock "not-taken"). A writeCB1 described in the previous embodiment satisfies only one out of many waiting callbacks. However, in the case the Test succeeds and the Set takes place, then there is no need to wake up any callback, as its corresponding RMW is destined to fail. This expectation holds for the write of successful lock acquires, leading to the potential for optimization with the addition of a writeCB0.

FIG. 6 shows the performance issue with writeCB1 in this scenario. Therein, core 2 performs a RMW and gets the lock. In the process, its read sets all F/E bits to "empty" (0). At this point, no other core can read the value of the lock. Instead, subsequent reads must set a callback (steps 2-3 in FIG. 6). If the RMW succeeds and writes the lock using a writeCB1, it will wake up one of the waiting cores—in this example, core 3 (step 4). However, since the lock was just acquired by core 2, the acquire of core 3 is bound to fail and has to be repeated (step 5). In effect, core 3 loses its turn because it was woken up prematurely. When the lock is then released with a writeCB1, core 0 is woken up (step 6). Its RMW succeeds (the lock just changed value, step 7) and core 0 enters its critical section by writing the lock. Core 0, in turn, prematurely wakes up core 1 (step 8).

This situation is avoided if the write of the RMW does not wake up any callbacks: i.e., with a writeCB0. FIG. 7 shows the same example as FIG. 6 except using a writeCB0 in the RMW operations instead of a writeCB1. By exploiting knowledge of the semantics of a lock acquire, the writeCB0 embodiment optimizes the hand-off of the lock among cores, without unnecessary traffic.

The previous embodiments illustrate different mechanisms by which an explicit callback request instruction can be serviced when sent from a core 102 (or thread) to the memory hierarchy. However, according to other embodiments, callback requests can be embedded into (or be implicit with) the issuance of other instructions by the cores 102 (or threads). Some examples now follow.

To implement races, loads and stores and atomic instructions operate directly on the global cache 108. In one embodiment "load-through," and "store-through" instructions specifically for races, skip the L1 caches 106 and go directly to the global cache 108 and the callback directory 110, but do not cause the self-invalidation or self-downgrade of any other address. Separate fences are needed in this case to enforce desired orderings.

In one embodiment a load_throughgenerates a read_through read that has the behavior of a non-blocking callback. It consumes a value if one is available (i.e., sets the F/E to "empty" if it was "full") but does not block and returns the current value of the data if there is no new value (i.e., F/E bit previously set to "empty"). A load_through optionally allocates an entry in the callback directory 110 if it misses there.

In one embodiment a load_through instruction, called load-callback (ld_cb), generates a callback read, and is typically used in a spin-loop. An optional load_through instruction without a callback generates a read_through read and can precede the spin-loop to consume any outstanding callbacks left from previous invocations of the callback. The user, or the compiler, or both can insert load-callback instructions at the appropriate places, for instance in spin-waiting idioms. Synchronization and related multithreading libraries can also be annotated with the appropriate call-back loads.

Store_through instructions are of three types according to an embodiment: Store-callback0 (st_cb0) that issues a writeCB0 write, Store-callback1 (st_cb1) that issues a writeCB1 write, and Store-through (st_through) or Store-callbackAll (st_cbA) that issues a writeCBall write. All of them perform the write-through immediately, and wake up 0, 1, or all callbacks waiting at the callback directory.

Atomic instructions are composed of a load-through and store-through performed atomically. Either the load or the store can be one of the previous types. To keep the name short, we denote them as {ld|ld_cb}&{st_cb0|st_cb1|st_cbA}. Table 1 lists all the types with an example of where they are used.

TABLE 1

| Operation | Example and Comments |
| --- | --- |
| ld_through | General conflicting load. First loan in spin-waiting. LLC responds immediately. Resets the F/E bit. |
| ld_cb | Subsequent (blocking) loads in spin-waiting. Waits for F/E bit to be full. Resets F/E bit. |
| st_cb0 | Not used. Does not service any callbacks. |
| st_cb1 | Lock release. Service one callback. |
| St_through (or st_cbA) | General conflicting store. Barrier release. Services all callbacks. |
| {ld} & {st_cb0} | Test&Test&Set to acquire a lock and enter a critical section. |
| {ld} & {st_cb1} | Fetch&Add to signal one waiting thread. |
| {ld} & {st_cbA} | Fetch&Add in a barrier. |
| {ld_cb} & {st_cb0} | Spin-waiting on Test&Set to acquire a lock and enter a critical section. |
| {ld_cb} & {st_cb1} | Not used. |
| {ld_cb} & {st_cbA} | Not used. |

As another example, in an embodiment a callback read is generated via a new instruction called "compare and callback". The instruction according to this embodiment has the following functionality, shown below in three steps:
1. Load_through T, M \\ load a temp register T from memory location M
2. Compare T, R \\ compare register T to register R (or an immediate value)
3. If successful continue; otherwise issue a callback (ld_cb) to M and wait for reply.

When the reply arrives the instruction resumes from step 2, and repeats until it continues to the next instruction (in the "if" clause of step 3). The comparison (equality, inequality, other), the result of the comparison (successful or unsuccessful), the result of the instruction when it exits (registers updated or other side effects), and the way the wait is performed (pause, sleep, thread re-schedule, etc.) can be defined appropriately by those skilled in the in the art. The instruction, if interrupted for any reason, restarts from the load.

The user, or the compiler, or both can insert compare-and-callback instructions at the appropriate places, for instance in spin-waiting idioms. Synchronization and related multithreading libraries can also be annotated with the appropriate call-back loads.

According to another embodiment, load-linked/store-conditional instructions (e.g., ldl_l/stl_c and ldq_l/stq_c, Alpha architecture, lwarx/stwcx, PowerPC architecture, ll/sc, MIPS architecture, and ldrex/strex, ARM version 6 and above) can be implemented with callbacks and a callback directory as follows. A load-linked instruction executed by a core reads the current value (from the LLC) and sets a callback (the corresponding CB bit of this core) but does not block. Execution continues with the next instruction in program order. A store-conditional instruction executed by a core succeeds (and writes to the memory location) only when the corresponding CB bit has been set by the same core, but no other CB bit is set; in any case the store-conditional clears the CB bit corresponding to the core that executes this instruction.

In an alternative embodiment the load-linked instruction clears all other CB bits when it sets the CB bit corresponding to the core executing this instruction.

Figure 8:
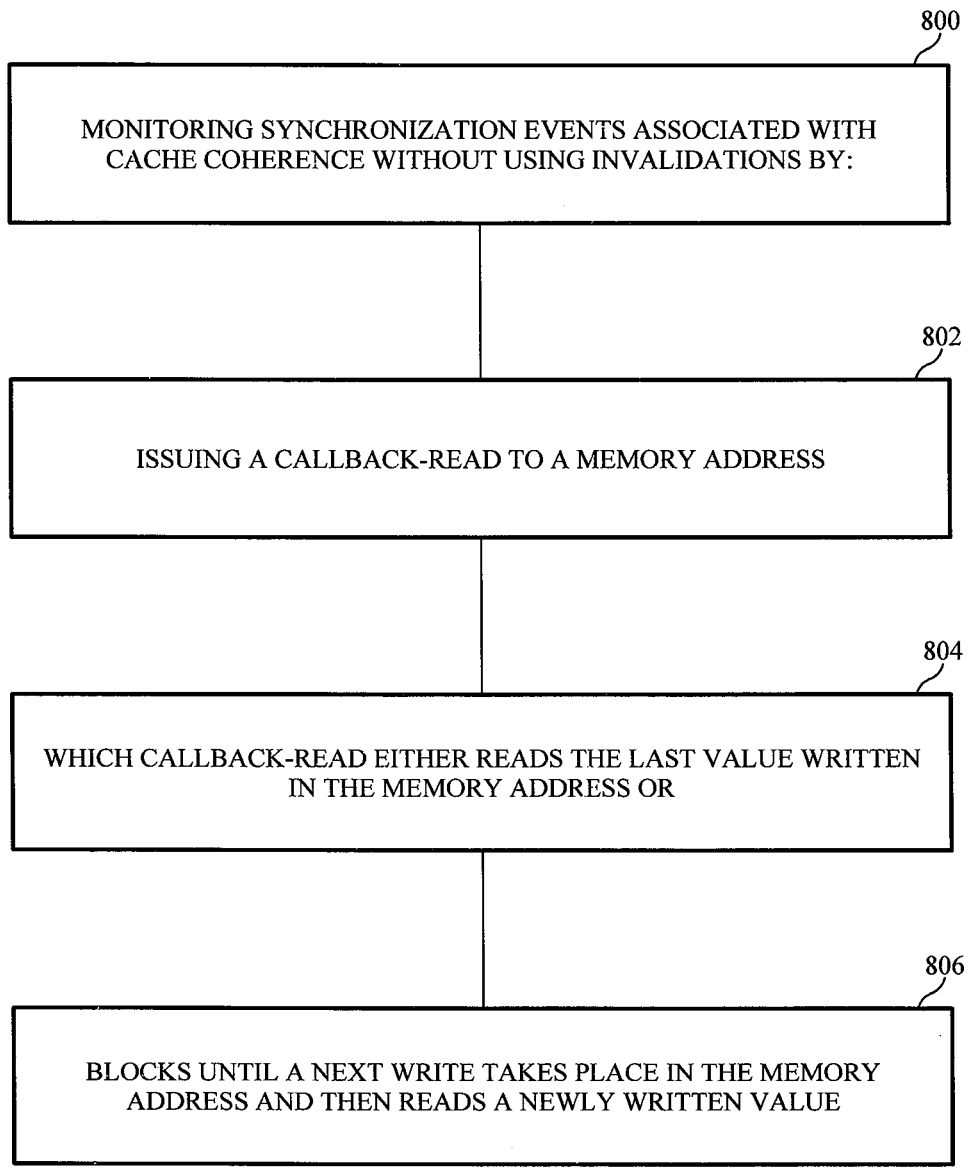
FIG. 8 is a flowchart illustrating a method for performing a callback read according to an embodiment.

In addition to being implemented in, and characterized as, a computer system as described above, embodiments can also be characterized as methods. For example, as shown in the flow chart of FIG. 8, a method for performing event monitoring, e.g., spin waiting, without using explicit invalidations according to an embodiment can include a number of steps. Therein, as indicated by step 800, a computer system monitors one or more synchronization events without using explicit invalidations by performing certain steps. For example, at step 802, a core issues a callback read to a memory address, e.g., associated with a synchronization event such as a lock. If the address has been written (e.g., if the value of the core's corresponding F/E bit for that address is in the state "full") the callback read completes immediately (step 804); otherwise callback read blocks and awaits a write to that address (step 806).

To test the efficacy of the embodiments, Applicants have performed various evaluations using a simulator. Specifically, an evaluation was performed is based on Wisconsin GEMS, which is a detailed simulator for multiprocessor system modeling in-order cores. The Ruby cycle-accurate memory simulator (provided by GEMS), offers a detailed timing model. The interconnect 109 was modeled with the GARNET network simulator. The simulated system used to test an embodiment was a 16-core chip multiprocessor. Energy consumption was modeled with the CACTI 6.5 tool, assuming a 32 nm process technology.

A wide variety of parallel applications were used for this evaluation, in particular, the entire Splash-2 suite with the recommended input parameters and several benchmarks from the PARSEC benchmark suite, all of them with the simmedium input, except Fluidanimate and Streamcluster that use the simsmall input.

Figure 9:
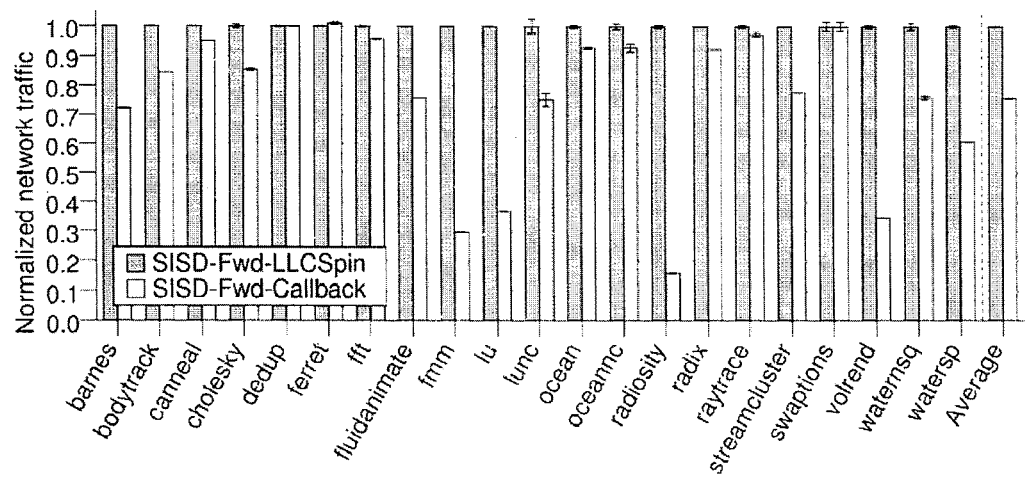
FIG. 9 is a graph illustrating simulation results comparing a multiprocessing system's performance using callback mechanisms according to an embodiment with that multiprocessing system's performance using a conventional self-invalidation protocol.

Specifically, the evaluation showed the impact of using a callback mechanism according to these embodiments by comparing the callback with a self-invalidation protocol that spins on the global cache 108. FIG. 9 shows the comparative results between a simulated system using callbacks (SISD-Fwd-Callback) and a similar simulated system using self-invalidations which spin on the LLC (SISD-Fwd-LLCSpin). Network traffic is where the important impact of the embodiments can be seen as execution time of the simulated applications remains largely unaffected. On average, as shown in FIG. 9, usage of callback mechanisms according to the embodiments reduces network traffic by 25% while for some spin-intensive applications the effect is much greater.

From the foregoing, it will be appreciated that the embodiments apply to (but are not limited to) computer systems that use self-invalidation in their local caches to maintain cache coherence, and as an alternative to grafting explicit invalidations onto a self-invalidation protocol to handle situations, like spin-waiting, that self-invalidation protocols handle poorly. Although those skilled in the art will appreciate the differences between callback mechanisms, as described herein, and explicit invalidations, some of those differences are reiterated below for clarity.

A callback is different than an explicit invalidation as it is explicitly requested and waited upon. For similar reasons, a callback is different than unsolicited update operations (e.g., as in update protocols). From the point of view of the cache, a callback read is still an ordinary request-response transaction—no other complexity is involved. The callback introduces no protocol races because cores are either blocked waiting for the callback response or immediately complete the read. From the point of view of the global cache 108, a callback is a simple data response without any further bookkeeping.

In contrast, explicit invalidations are unsolicited and their arrival unanticipated. An explicit invalidation can arrive to a core at any time and at any cache state, which dramatically increases the race conditions and therefore the number of states required in the caches to account for all the scenarios. In addition, explicit invalidations are not suitable for efficient virtual-cache coherence, for the same reason. Explicit invalidations are not anticipated at a virtual cache, which means that a reverse translation (physical to virtual) must be performed to ensure correct delivery to the virtual cache. In contrast, callbacks are explicitly waited for (as a result of a request) so they require no address identification.

In terms of energy efficiency, callbacks have at least two advantages over explicit invalidations. First, callbacks are more efficient in the number of messages needed to communicate a new value. A callback requires three messages: {callback, write, data} or {write, callback, data} depending on the relative order between the read and the write. Explicit invalidation, however, requires five messages: {write, invalidation, acknowledgment, load, data}. A further important benefit of a callback is that a core can easily go into a power-saving mode while waiting for its callback read to be fulfilled.

Callbacks are compatible with virtual-cache coherence without reverse translation, as it is purely a request-response transaction. A callback message to a core does not need reverse translation because the core is explicitly waiting for it. In case multiple callbacks are allowed from the same core (i.e., in a multithreaded core), each can have its own CB bit, or their requests can queue (at the callback directory) on the same CB bit. In the case where the callback directory is unable to hold all state, the end result is to turn callbacks, effectively, into simple reads.

Callbacks are designed to, among other things, optimize spin-waiting so that it blocks between consecutive writes (creation of values). One property of a callback is that it will return either the last written value or it will block waiting for the next written value. A callback that falls between two writes will return the value of one of these two writes, but does not skip a write. The previous value is returned in the case of a replacement in the callback directory.

Callback semantics are also different than Full/Empty semantics. In the latter, full/empty semantics are designed for producer-consumer synchronization, and both reads and writes block: reads block on Empty and writes block on Full. By way of contrast, callback has the semantics of a read; it cannot block writes which proceed unconstrained to update the value.

Various embodiments are described above, however those skilled in the art will also appreciate that other embodiments are contemplated, some of which are described below.

According to one embodiment a callback-read from a core to an address with a set of CB bits, completes by reading the current value in this address when the CB bit corresponding to this core is set, and when the corresponding CB bit is unset, the callback-read sets the CB bit and completes when a new value is written in this address and the value forwarded to the core that issued the callback-read, and a write to the same address, that is made globally visible, forwards the written value to all the cores that have their corresponding CB bit set for this address and clears the CB bits that were set and sets the CB bits that were unset.

According to one embodiment a set of callback (CB) bits and full/empty (F/E) bits, is associated with each memory address, each CB bit and each F/E bit of an address' set corresponds to a core.

According to a further embodiment a callback-read from a core to an address with a set of CB and F/E bits, completes by reading the current value in this address when the F/E bit corresponding to this core is set, and when the corresponding F/E bit is unset, the callback-read sets the corresponding CB bit and completes when a new value is written in this address and the value forwarded to the core that issued the callback-read, and a write, sometimes being referred to as writeCBall, to the same address, that is made globally visible, forwards the written value to all the cores that have their corresponding CB bit set for this address, and clears the CB bits that were set and sets the F/E bits that correspond to the CB bits that were unset.

According to a further embodiment a load_through generates a read_through read that has the behavior of a non-blocking callback. It consumes a value if one is available (i.e., sets the F/E to "empty" if it was "full") but does not block and returns the current value of the data if there is no new value (i.e., F/E bit previously set to "empty"). A read_through optionally allocates an entry in the callback directory 110 if it misses there.

According to a further embodiment an address' F/E bits that correspond to the cores, act in unison as if they were a single bit. If any F/E bit is set, all others are set; if any is cleared, all others are cleared.

According to a further embodiment a write being referred to herein as writeCB1, to an address, that is made globally visible, forwards the written value to only one core that has its corresponding CB bit set for this address, and clears the corresponding CB bit that was set. If no core has a CB bit set, then the write sets all the F/E bits.

According to further embodiment a write being referred to herein as writeCB0, to an address, that is made globally visible, does not forward the written value any core that has its corresponding CB bit set for this address.

According to a further embodiment CB bits for a set of addresses are kept in a callback directory located at the point or points where writes become globally visible in the computer system.

According to a further embodiment CB bits and F/E bits for a set of addresses are kept in a callback directory located at the point or points where writes become globally visible in the computer system.

According to a further embodiment the callback directory is limited in size and CB and F/E bits for an address are evicted to accommodate the bits for a new address, and the current data value of the evicted address is forwarded to all the cores that have the corresponding CB bit set for the evicted address, and the CB bits for the new address that replaces the evicted address are initialized to unset and the F/E bits are initialized to set (full).

According to a further embodiment a callback to a memory address is issued by a compare-and-callback instruction, that reads the current value in the address, compares it to some other value supplied to the instruction and completes, and the processor core continues to the next instruction, when the comparison succeeds and issues a callback to the address when the comparison fails, and repeats from the comparison when it receives a response to the callback until the comparison succeeds and the instruction completes.

The compare-and-callback instruction may take the processor core to a low power state when the instruction is awaiting for a response to a callback.

According to another embodiment, a computer system according to the present invention comprises multiple processor cores, a main memory, at least one local cache memory associated with and operatively coupled to each core for storing one or more cache lines accessible only by the associated core, a global cache memory, the global cache memory being operatively coupled to the local cache memories and main memory and accessible by the cores, the global cache memory being capable of storing a plurality of cache lines, and wherein a core issuing a callback-read to a memory address either reads the last value written in this address or blocks until the next write takes place in this address and reads the new value.

The computer system may comprise a set of callback (CB) bits which is associated with each memory address, each bit in the set corresponds to a core.

In the computer system a callback-read from a core to an address with a set of CB bits, completes by reading the current value in this address when the CB bit corresponding to this core is set, and when the corresponding CB bit is unset, the callback-read sets the CB bit and completes when a new value is written in this address and the value forwarded to the core that issued the callback-read, and a write to the same address, that is made globally visible, forwards the written value to all the cores that have their corresponding CB bit set for this address and clears the CB bits that were set and sets the CB bits that were unset.

The set of callback (CB) bits and full/empty (F/E) bits, may be associated with each memory address, each CB bit and each F/E bit of an address' set corresponds to a core.

According to one embodiment a callback-read from a core to an address with a set of CB and F/E bits, completes by reading the current value in this address when the F/E bit corresponding to this core is set, and when the corresponding F/E bit is unset, the callback-read sets the corresponding CB bit and completes when a new value is written in this address and the value forwarded to the core that issued the callback-read, and a write to the same address, that is made globally visible, forwards the written value to all the cores that have their corresponding CB bit set for this address and clears the CB bits that were set and sets the F/E bits that correspond to the CB bits that were unset.

According to one embodiment CB bits for a set of addresses are kept in a callback directory located at the point or points where writes become globally visible in the computer system.

According to one embodiment the CB bits and F/E bits for a set of addresses are kept in a callback directory located at the point or points where writes become globally visible in the computer system.

According to a further embodiment the callback directory is limited in size and CB and F/E bits for an address are evicted to accommodate the bits for a new address, and the current data value of the evicted address is forwarded to all the cores that have the corresponding CB bit set for the evicted address, and the CB bits for the new address that replaces the evicted address are initialized to unset and the F/E bits are initialized to set (full).

According to a further embodiment the CB bits correspond to program threads.

According to a further embodiment a callback to a memory address is issued by a compare-and-callback instruction, that reads the current value in the address, compares it to some other value supplied to the instruction and completes, and the processor core continues to the next instruction, when the comparison succeeds, and issues a callback to the address when the comparison fails, and repeats from the comparison when it receives a response to the callback until the comparison succeeds and the instruction completes. The compare-and-callback instruction may take the processor core to a low power state when the instruction is awaiting for a response to a callback.

The embodiments thus provide an efficient mechanism for dealing with, among other things, spin-waiting without the overhead and complexity of including an explicit invalidation protocol alongside a self-invalidation protocol, and without reverting to invalidation signatures or specialized hardware queue locking. In this respect, the embodiments retain valuable properties of self-invalidation protocols: simplicity, low cost, compatibility with virtual caches. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computer system comprising:
   multiple processor cores;
   at least one local cache memory associated with and operatively coupled to each core for storing one or more cache lines accessible only by the associated core;
   a shared memory, the shared memory being operatively coupled to the local cache memories and accessible by the cores, the shared memory being capable of storing a plurality of cache lines; and
   a callback directory containing a set of callback (CB) bits associated with a memory address, wherein each CB bit in the set corresponds to a core;
   wherein a core issuing a callback-read to the memory address either reads the last value written in the memory address, or is blocked from reading from the memory address until the next write takes place in the memory address and then reads a new value of said next write, such that the callback-read enables event monitoring for coherence of the at least one local cache and the shared memory without using explicit invalidations,
   when a CB bit corresponding to the core that issued the callback-read is set, the callback-read is completed by the core reading the last value in the memory address;
   when the CB bit corresponding to the core that issued the callback-read is unset, the callback-read triggers setting of the CB bit and the callback-read is completed when the new value is written in the memory address and the new value is forwarded to the core that issued the callback-read; and
   when the new value is written in the memory address, the new value is forwarded to all of the cores that have their corresponding CB bit set for the memory address, CB bits previously set for the memory address are cleared, and CB bits previously unset for the memory address are set.

2. The computer system of claim 1 where the CB bits correspond to program threads of the cores.

3. The computer system of claim 1, wherein the callback read to the memory address is issued by a compare-and-callback instruction wherein the core either continues to a next instruction or issues the callback read to the memory address.

4. The computer system of claim 3, wherein the compare-and-callback instruction takes the core to a power-saving state when the compare-and-callback instruction is awaiting a response to a callback read.

5. The computer system of claim 1, further comprising a callback queue which stores pending callback requests issued for the memory address.

6. A computer system comprising:
   multiple processor cores;
   at least one local cache memory associated with and operatively coupled to each core for storing one or more cache lines accessible only by the associated core;
   a shared memory, the shared memory being operatively coupled to the local cache memories and accessible by the cores, the shared memory being capable of storing a plurality of cache lines; and
   a callback directory containing a set of callback (CB) bits and full/empty (F/E) bits associated with a memory address, wherein each CB bit and each F/E bit of the set corresponds to a different one of the cores;
   wherein a core issuing a callback-read to the memory address either reads the last value written in the memory address, or is blocked from reading from the memory address until the next write takes place in the memory address and then reads a new value of said next write, such that the callback-read enables event monitoring for coherence of the at least one local cache and the shared memory without using explicit invalidations
   when an F/E bit corresponding to the core that issued the callback-read is set, the callback-read from the core to the memory address with the set of CB and F/E bits is completed by the core reading the last value in the memory address;
   when the F/E bit corresponding to the core that issued the callback-read is unset, the callback-read triggers setting of a CB bit which corresponds to the memory address, and the call-back read is completed when the new value is written in the memory address and the new value is forwarded to the core that issued the callback-read; and when the new value is written in the memory address, the new value is forwarded to all of the cores that have a corresponding CB bit set for the memory address, corresponding CB bits previously set are cleared, and F/E bits that correspond to the CB bits previously unset are set.

7. The computer system of claim 6 wherein a read through read of the memory address issued by a core bypasses the at least one local cache memory associated with the core and resets an F/E bit of the memory address that corresponds to the core.

8. The computer system of claim 6 wherein the callback directory also contains an All/One bit associated with the memory address; and wherein when the All/One bit is set to one, the F/E bits for the memory address operate in unison such that the F/E bits for the memory address act as a single F/E bit; and wherein when the All/One bit is set to all, the F/E bits for the memory address operate independently of one another such that each F/E bit has its value changed independently by a corresponding core.

9. The computer system of claim 8 wherein a write callback one write instruction to the memory address sets the All/One bit to one; wherein the write callback one write instruction selects a single core that has its corresponding CB bit set for the memory address and forwards a written value to only this single core and resets the corresponding CB bit; and further wherein when no core has its corresponding CB bit set for the memory address, the write callback one write instruction sets all the F/E bits which correspond to the memory address.

10. The computer system of claim 8 wherein a write callback zero write instruction to the memory address sets the All/One bit which corresponds to the memory address to one.

11. The computer system of claim 8 wherein a write callback all write instruction to the memory address sets the All/One bit to all; forwards a written value to all of the cores that have their corresponding CB bit set for the memory address, clears the corresponding CB bits previously set and sets the F/E bits that correspond to CB bits previously unset.

12. The computer system of claim 1, wherein each of the multiple processor cores is configured to issue at least one of a callback read and a callback write to access the callback directory using one of a corresponding special load/store or atomic instruction.

13. The computer system of claim 1 wherein the callback directory is located at one or more cache levels where writes become globally visible in the computer system.

14. The computer system of claim 6 wherein, when there is no free space in the callback directory, the memory address is evicted to accommodate a new memory address and a current data value of the evicted memory address is forwarded to all the cores that have the corresponding CB bit set for the evicted memory address; and wherein the CB bits for the new memory address that replaces the evicted address are initialized to unset and the F/E bits for the new memory are initialized to set.

* * * * *